United States Patent [19]

Hanson et al.

[11] Patent Number: 5,778,690
[45] Date of Patent: Jul. 14, 1998

[54] METHOD FOR CONTINUOUSLY RUNNING A MULTI-TEMP REFRIGERATION CIRCUIT AT A HIGH COMPRESSOR SPEED

[75] Inventors: Jay Lowell Hanson, Bloomington; Steven Bruce Helgeson, Lakeville; Stanley Oscar Hoium, W. St. Paul, all of Minn.

[73] Assignee: Thermo King Corporation, Minneapolis, Minn.

[21] Appl. No.: 855,273

[22] Filed: May 13, 1997

[51] Int. Cl.$^6$ .................................................. F25B 13/00
[52] U.S. Cl. ........................ 62/160; 62/196.4; 62/228.4; 62/DIG. 17
[58] Field of Search .................... 62/115, 117, 196.1, 62/196.3, 196.4, 197, 199, 200, 228.1, 228.3, 228.4, 323.1, 324.1, 324.4, 324.6, DIG. 17, 160, 159

[56] References Cited

U.S. PATENT DOCUMENTS

| | | | |
|---|---|---|---|
| 5,107,686 | 4/1992 | Howland | 62/196.4 X |
| 5,168,713 | 12/1992 | Howland | 62/160 X |
| 5,172,559 | 12/1992 | Renken et al. | 62/160 X |
| 5,172,560 | 12/1992 | Jurewicz et al. | 62/160 X |
| 5,291,745 | 3/1994 | Hanson | 62/228.4 X |

Primary Examiner—Harry B. Tanner
Attorney, Agent, or Firm—Nawrocki, Rooney & Sivertson, P.A.

[57] ABSTRACT

A method for continuously operating a multi-temp refrigeration system at a high compressor speed is provided. Such refrigeration systems include a compressor for compressing a refrigerant at a high speed and a low speed, a condenser coil for receiving and liquefying gaseous refrigerant, first and second evaporator coils for heating or cooling two different conditioned spaces, a hot gas valve for admitting hot gaseous refrigerant to one of the evaporator coils in order to heat its associated conditioned space, and a condenser inlet valve for rerouting a flow of hot gaseous refrigerant from the condenser coil to the evaporator coils. In the method of the invention, the evaporator hot gas valve is first opened to heat one of the conditioned spaces, and the condenser inlet valve is then closed to direct a flow of hot gaseous refrigerant to the opened hot gas valve. Instead of continuously maintaining the condenser inlet valve in a closed position, this valve is periodically opened and reclosed in the method of the invention to maintain a refrigerant head pressure in the system below a level associated with a system shut-down condition. The method obviates the need for operating a multi-temp refrigeration system at a low compressor speed when the system is used to simultaneously heat and cool different conditioned spaces.

18 Claims, 2 Drawing Sheets

5,778,690

1

METHOD FOR CONTINUOUSLY RUNNING A MULTI-TEMP REFRIGERATION CIRCUIT AT A HIGH COMPRESSOR SPEED

BACKGROUND OF THE INVENTION

This invention generally concerns a method for operating a multi-temp refrigeration system, and is specifically concerned with a method for continuously operating such a system at a high compressor speed even when the system is used to simultaneously heat and cool different conditioned spaces.

Multi-temp refrigeration systems are well known in the prior art. Such systems generally includes a refrigerant compressor, a condenser coil, at least two different evaporator coils for heating or cooling two different conditioned spaces, and a hot gas valve for each of the evaporator coils for selectively admitting hot gaseous refrigerant to implement a defrost or heating cycle. A condenser inlet valve is also included in such systems for redirecting hot gaseous refrigerant from the condenser coil to one or both of the evaporator coils during such a defrost or heating cycle.

Such multi-temp systems find particular application in tractor-drawn refrigerated trailers, as they allow different spaces within the trailer to be heated or cooled at different temperatures to accommodate different temperature sensitive cargoes. In such an application, the refrigerant compressor is usually driven by a dedicated diesel engine through a gear train that is capable of rotating the crank shaft of the compressor at either a low speed of 1400 rpms, or a high speed on the order of 2400 rpms to utilize the full output of the refrigeration system. In many applications, it is desirable to continuously operate the system at the high compressor speed. However, the applicants have observed that when the different evaporator coils of such a system are used to simultaneously cool and heat their respective conditioned spaces, the head pressure of the system becomes unacceptably high (i.e., 400 psi) if the compressor is continuously operated at high speed. Because such an over-pressure condition may automatically trigger an unwanted system shut-down, it is usually necessary to switch the operation of the compressor to low speed to lower the system pressure. Unfortunately, at such low compressor speeds, the full capacity of the system is not available to simultaneously heat and cool different conditioned spaces in the trailer.

Clearly, there is a need for a technique for continuously operating such multi-temp refrigeration systems at a high compressor speed without the advent of excessive head pressure in the system that can trigger unwanted shutdowns. Ideally, such a technique should be applicable to a broad range of existing multi-temp refrigeration systems without the need for installing additional sensors, valves, or electronic circuitry. Finally, such a technique should be simple and safe to implement.

SUMMARY OF THE INVENTION

Generally speaking, the invention is a method of operating a multi-temp refrigeration system at a high compressor speed that advantageously prevents the occurrence of nuisance shut-downs. The method of the invention generally comprises the initial steps of opening at least one of the plurality of evaporator hot gas valves so that the evaporator coils of the system operate to simultaneously heat and cool different conditioned spaces, and closing the condenser inlet valve in order to direct a flow of hot gaseous refrigerant through the open hot gas valve. In the final steps of the

2 method, the condenser inlet valve is periodically opened and closed to maintain a refrigerant head pressure below a level associated with a system shut-down condition, which in many systems is approximately 400 psi.

In the preferred method, there is a delay of between 3 and 8 seconds between the opening of the evaporator hot gas valve and the closing of the condenser inlet valve in order to insure that an over-pressure condition will not arise in the system which could trigger the kind of emergency shutdown that the method of the invention seeks to avoid. As a further safeguard, the head pressure of the system is preferably continuously monitored, and the control circuit of the system is programmed not to reclose the condenser inlet valve unless the detected head pressure of the system is below about 250 psi.

Finally, to compensate for the loss of refrigerant to the condenser coil every time the condenser inlet valve opens to avoid an over-pressure condition, the method of the invention may include the step of opening the pressure valve of the receiver tank every time the condenser inlet valve lowers the pressure of the system in order to force additional liquid refrigerant to the evaporator coils.

BRIEF DESCRIPTION OF THE SEVERAL FIGURES

FIG. 1 is a schematic diagram of a refrigeration circuit capable of heating or cooling two different conditioned spaces, illustrating the flow and phase of the refrigerant when the circuit is used to cool both spaces, and FIG. 2 illustrates the flow and phases of the refrigerant when the circuit illustrated in FIG. 1 simultaneously cools the upper conditioned space and heats the lower conditioned space.

DETAILED DESCRIPTION OF THE PREFERRED EMBODIMENT

Figure 1:
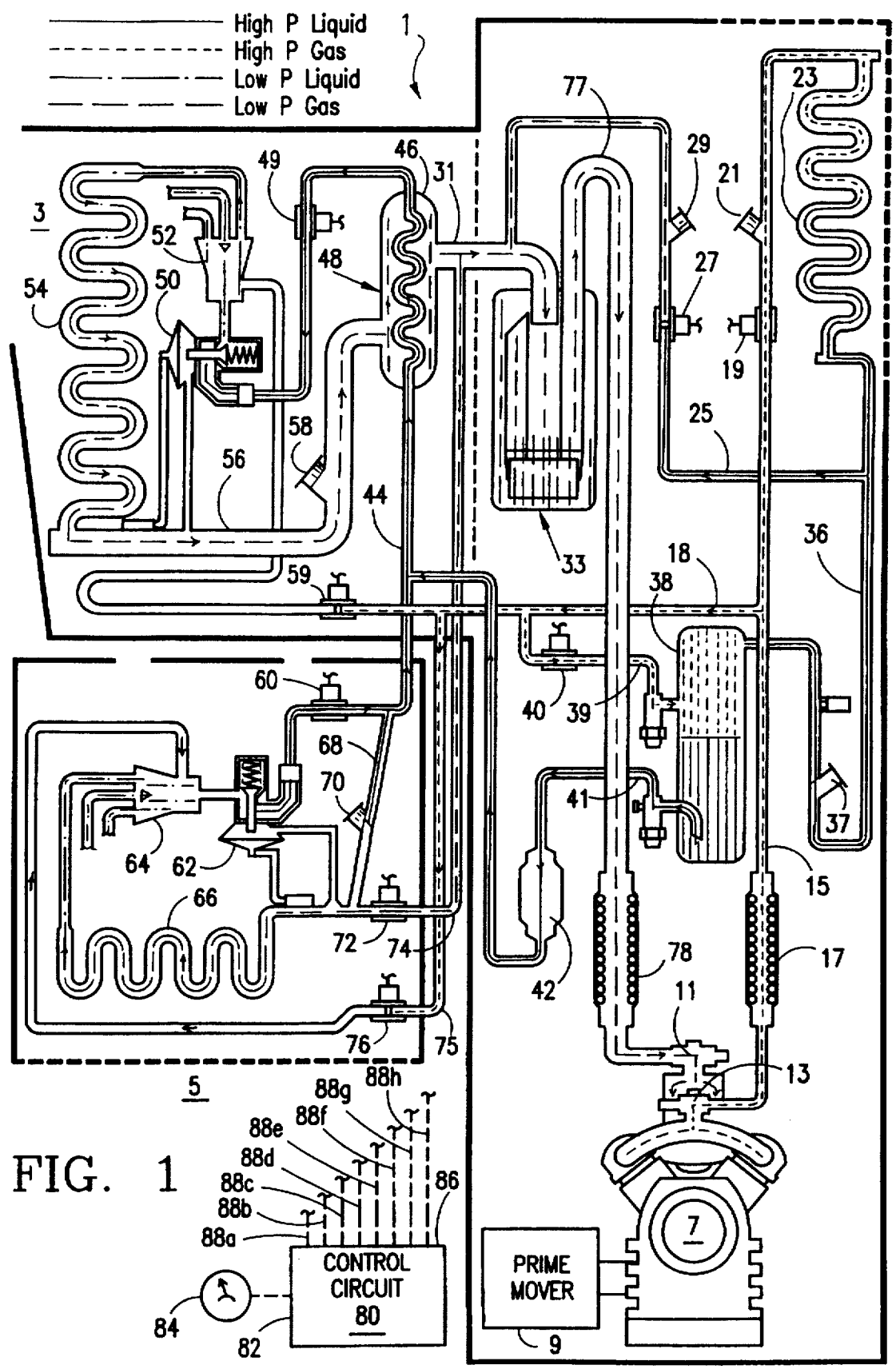
Figure 2:
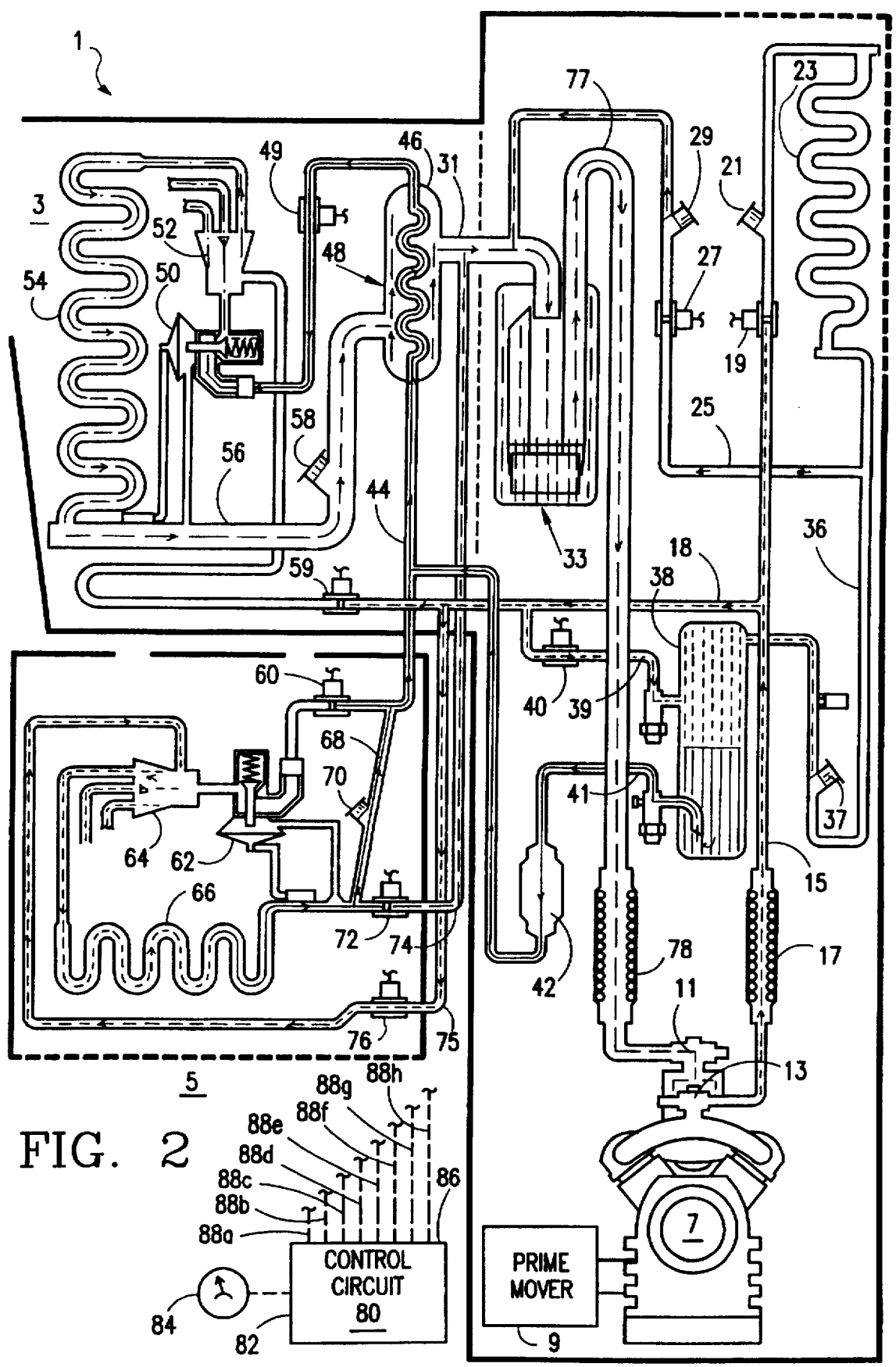

The method of the invention is best understood when described in the context of a multi-temp refrigeration system 1 such as the dual temperature system 1 illustrated in FIGS. 1 and 2.

This system 1 is capable of simultaneously conditioning both a front space 3 and a back space 5 which may be, for example, the front and back spaces of a tractor-drawn refrigerated trailer. Such a system 1 includes a reciprocating compressor 7 driven by a prime mover 9. The prime mover 9 may be a diesel engine in combination with an appropriate transmission that is capable of rotating the crank shaft of the reciprocating compressor 7 at a low speed of 1400 rpms, or a high speed of 2400 rpms. The compressor 7 includes an inlet for receiving cool, low pressure gaseous refrigerant and an outlet for discharging hot, high gaseous refrigerant. The outlet 13 is coupled to an outlet conduit 15 that includes an acoustical buffer 17 for muffling the noise associated with the discharge strokes of the compressor 7.

With specific reference to FIG. 1, a condenser bypass conduit 18 is connected to the outlet conduit 15 downstream of the acoustical buffer 17. This conduit 18 is connected to the distributor 52 of the evaporator 54 used to cool and heat the front space 3. A solenoid-operated hot gaseous refrigerant valve 59 is disposed in the condenser bypass conduit 18. When the evaporator coil 54 is used to cool the front space 3, valve 59 is closed so that no hot gaseous refrigerant enters the coil 54 as is shown in FIG. 1.

Downstream of the bypass conduit 18, the outlet conduit 15 includes a solenoid-operated condenser inlet valve 19 and a check valve 21 for admitting a flow of hot gaseous refrigerant to the condenser coil 23. When the evaporator coils 54 and 66 are used to cool their respective spaces 3 and 5, the condenser inlet valve 19 is open as shown. The consequent discharge of hot, gaseous refrigerant into the condenser coil 23 liquifies the refrigerant. The liquified refrigerant flows into drain conduit 25 and receiver inlet conduit 36.

Drain conduit 25 includes a solenoid-operated purge valve 27 which is closed as shown in FIG. 1 when the evaporator coil 54 is used to cool the front space 3. A check valve 29 is disposed downstream of the purge valve 27 to prevent gaseous refrigerant from flowing into the drain conduit 25 from the outlet 31 of heat exchanger 48. Liquid refrigerant flowing through the receiver inlet conduit 36 flows through check valve 37 before entering receiver tank 38. A receiver tank pressure line 39 is connected between the condenser bypass conduit 18 and an upper portion of the receiver tank 38. A solenoid-operated pressure valve 40 is disposed in the pressure line 39. Normally, pressure valve 40 is closed, as is indicated in FIG. 1. However, during start-up or other conditions to be explained in more detail hereinafter, pressure valve 40 is opened in order to pressurize the top portion of the receiver tank 38, and thereby discharge high pressure liquid refrigerant out of the receiver discharge line 41, through filter 42, and into the evaporator coil conduit 44.

The upper branch of the evaporator supply conduit 44 conducts the flow of pressurized liquid refrigerant through a coiled section 45 of the conduit 44 that is surrounded by a jacket 46, thereby forming a heat exchanger 48. When the evaporator coil 44 is used to cool the front space 3, the jacket 46 conducts a flow of cool, low pressure gaseous refrigerant around the coiled section 45 of the supply conduit 44, thereby advantageously cooling it before it flows through solenoid-operated shut-off valve 49 and into expansion valve 50. As is further indicated in FIG. 1, expansion valve 50 converts the high pressure liquid refrigerant to low pressure liquid refrigerant while discharging it through an evaporator coil distributor 52. From thence, the liquid refrigerant is expanded into a low pressure gas through evaporator coil 54 (only one section of which is shown to simplify the drawing). The outlet end of each of the evaporator coil 54 is connected to the vapor collector conduit 56, which in turn discharges low pressure, gaseous refrigerant through check valve 58 and into the previously-described jacket 46 of heat exchanger 48. From heat exchanger 48, low pressure gaseous refrigerant is discharged through nozzle outlet 31 into the accumulator 33. Here, the gaseous refrigerant is ultimately collected and discharged out into the compressor inlet conduit 77, where it passes through a second acoustical buffer 78 enroute to compressor inlet 11.

Turning now to the lower branch of the evaporator supply conduit 44, hot, pressurized liquid refrigerant flows through this portion of the conduit 44 and through solenoid-operated shut-off valve 60 when the evaporator coil 66 is used to cool the back space 5. From thence, the pressurized, liquid refrigerant flows into expansion valve 62, which converts it into low pressure liquid refrigerant and discharges it through evaporator coil distributor 64. Once discharged through the evaporator coil 66 (only one section of which is shown in order to simplify the drawings), the refrigerant is converted into a low-pressure gas which flows past bypass conduit 68 (which includes check valve 70), and through the solenoid-operated, liquid refrigerant shut-off valve 72. Once past the valve 72, the low pressure, gaseous refrigerant flows upwardly through gas outlet conduit 64 where it joins the gaseous refrigerant discharged out of nozzle outlet 31 leading into accumulator 33. From there, the gaseous refrigerant enters the compressor inlet 11 via inlet conduit 77 and acoustical buffer 78 as previously described.

The refrigeration system 1 illustrated in FIGS. 1 and 2 further includes a control circuit 80 which may be a simple microprocessor. Circuit 80 has an input side 82 which is electrically connected to a pressure sensor 84 that measures the pressure head between the inlet 11 and outlet 13 of the reciprocating compressor 7. Circuit 80 further includes an output side having control wires 80a–h which are connected to solenoid-operated valves 19, 27, 40, 49, 59, 60, 72, and 76 respectively.

FIG. 1 illustrates the operation of the refrigeration system 1 when it is used to simultaneously cool the front space 3 and back space 5. At start-up, the control circuit 80 opens condenser inlet valve 19, opens solenoid-operated valves 27, 40, 49, closes solenoid-operated valve 59, opens solenoid-operated valves 60 and 72, and closes valve 76. The initial opening of the receiver tank pressure valve 40 allows the pressure generated by the hot, gaseous refrigerant flowing through the outlet conduit 15, the condenser bypass conduit 18, and the receiver tank pressure line 39 to push liquid refrigerant through the receiver discharge line 41, filter 42, and evaporator coil supply conduit 44. The initial opening of purge valve 27 allows any liquid refrigerant that has collected in the coil 23 and conduit 25 to vaporize and be withdrawn into the accumulator 33. At this juncture in the operation of the system 1, the head pressure steadily increases from an initial pressure of under 200 psi. When pressure gauge 84 registers a head pressure of approximately 300 psi, the control circuit 80 will close solenoid-operated valves 27 and 40 as there is no further need for the discharge of liquid refrigerant from the receiver tank 38. Under a normal range of ambient temperature conditions, the system 1 can then continue to cool conditioned spaces 3 and 5 without any further opening or closing of the solenoid-operated valves.

If the system 1 is called upon to simultaneously cool conditioned space 3, and heat conditioned space 5, the refrigerant is routed in accordance with the diagram of the system 1 illustrated in FIG. 2. Under such circumstances, under start-up, control circuit 80 will close condenser inlet valve 19, open solenoid-operated valves 27, 40, and 49, close solenoid-operated valves 59, 60, and 72, and open valve 76. Such an arrangement does not affect the flow of refrigerant through the evaporator coil 54 which continues to cool the front space 3. This arrangement does, however, reverse the flow of hot gaseous refrigerant through the evaporator coil 66 so that it operates to heat the back space 5. The flow of refrigerant continues until the pressure gauge 84 again registers a head pressure of 300 psi or more, whereupon purge valve 27 and receiver tank pressure valve 40 are closed. If the head pressure of the system 1 does not significantly increase at this juncture, then the system 1 could continue to run with the compressor 7 operating at high speed (2400 rpms) in a more or less steady-state manner. Because of the resistance that the hot, gaseous refrigerant meets as it flows through distributor 64 into the small, individual inlet tubes leading to each of the evaporator coils 66, the head pressure typically continues to increase. If such pressure continued to increase without relief, the system 1 would automatically shut-down upon obtaining a head pressure of approximately 400 psi. Because of the operational nuisances caused by such emergency shut-downs, it was necessary, in the prior art, to operate the prime mover 9 at a low speed (1400 rpms) after the circuit 1 attained the desired setpoint temperatures in the conditional spaces 3 and 5. Of course, such prior art operation of the system 1 disadvantageously reduced the cooling and heating capacity of the evaporator coils 54, 66, respectively.

The method of the invention advantageously allows the compressor 1 to be continuously driven at high speed without the occurrence of nuisance shut-downs. In this method, as soon as the positions of the solenoid-operated valves are switched from that illustrated in FIG. 1 to that illustrated in FIG. 2, the control circuit 80 waits five seconds, and then senses the head pressure of the system 1. If the head pressure is under 250 psi (which it will be in the normal case), the control circuit 80 closes the condenser inlet valve 19. As with either of the previously-described start-up conditions, solenoid-operated valves 27 and 40 are open at this time to insure an adequate supply of high pressure, liquid refrigerant to the evaporator coils 54 and 56. When the pressure rises to 300 psi, control circuit 80 closes valves 27 and 40. If the pressure begins to approach 400 psi, the control circuit 80 will again open the condenser inlet valve 19, thereby relieving the excess pressure by allowing hot, gaseous refrigerant to flow into the condenser coil 33. Such an action almost immediately reduces the head pressure of the system from 400 psi to 225 psi or less, whereupon the previously-described steps of the method are repeated.

In an alternative method, the speed of the prime mover could be reduced from high speed to low speed upon the attainment of a head pressure on the order of 375 psi. If the head pressure continued to increase toward 400 psi, the condenser inlet valve 19 could be opened in the manner previously described to immediately lower the head pressure of the circuit 1 back to 225 psi or less.

The method of the invention is advantageously applicable to existing multi-temp refrigeration circuits without the installation of additional sensors or solenoid-operated valves. All that is necessary to implement the method of the invention is a minor-reprogramming of the control circuit, which is a simple microprocessor in the preferred embodiment. While the inventive method has been described in the context of a multi-temp circuit that services only two conditioned spaces, the method is applicable to multi-temp circuits that service three or more conditioned spaces. In circuits that service three or more conditioned spaces, the method allows the circuit to run at a high compressor speed whenever one or more of the evaporator coils is used to defrost or heat its respective conditioned space.

What is claimed:

1. A method for continuously operating a multi-temp refrigeration system at a high compressor speed, wherein said system includes a compressor for compressing a refrigerant at a high speed and a low speed, a condenser coil for receiving and liquefying hot gaseous refrigerant, at least first and second evaporator coils for heating and cooling at least two different conditioned spaces, respectively, a hot gas valve for admitting hot gaseous refrigerant to one of said first or second evaporator coils to heat one or the other of said conditioned spaces, and a condenser inlet valve for admitting a flow of hot gaseous refrigerant to said condenser coil, comprising the steps of
   (a) opening said evaporator hot gas valve to admit hot gaseous refrigerant through one of said evaporator coils;
   (b) closing said condenser inlet valve to direct a flow of hot gaseous refrigerant to said open evaporator hot gas valve, and
   (c) periodically opening and reclosing said condenser inlet valve to maintain a refrigerant head pressure in said system below a level associated with a system shut-down condition while continuously operating said compressor at said high speed.

2. The method defined in claim 1, further comprising the step of delaying the closing of said condenser inlet valve after said evaporator hot gas valve is opened for a time period of between three and eight seconds.

3. The method defined in claim 2, further comprising the step of continuing to delay the closing of said condenser inlet valve until the pressure falls at least 100 psi.

4. The method defined in claim 1, wherein said condenser inlet valve is opened when a system pressure of within 50 psi of a shutdown condition occurs.

5. The method defined in claim 1, wherein said system further includes a receiver tank for containing a reservoir of refrigerant, and a pressure valve for conducting hot, gaseous refrigerant from said compressor into said receiver tank to force pressurized liquid refrigerant into one of said first and second evaporator coils in order to cool one or more of said conditioned spaces.

6. The method defined in claim 5, further comprising the steps of opening said pressure valve when a system pressure falls below a predetermined level and closing said pressure valve when said system pressure rises above a predetermined level.

7. The method defined in claim 6, wherein said refrigeration system further includes a purge valve for recovering liquid refrigerant from the condenser coil.

8. The method defined in claim 7, further comprising the step of opening said purge valve when a head pressure of the system falls below a predetermined level, and closing said purge valve when said system pressure rises above a predetermined level.

9. The method defined in claim 2, wherein said delay in closing said condenser inlet valve is five seconds.

10. The method defined in claim 4, wherein said condenser inlet valve stays open until said system head pressure falls at least 150 psi.

11. A method for continuously operating a multi-temp refrigeration system at a high compressor speed, wherein said system includes a compressor for compressing a refrigerant at a high speed and a low speed, a condenser coil for receiving and liquefying hot gaseous refrigerant, multiple evaporator coils for heating or cooling two different conditioned spaces, multiple evaporator hot gas valves for admitting hot gaseous refrigerant to said multiple evaporator coils, respectively, to heat one or more of said conditioned spaces, and a condenser inlet valve for admitting a flow of hot gaseous refrigerant to said condenser coil, comprising the steps of:
   (a) opening one or more of said evaporator hot gas valves to heat one or more conditioned spaces while closing the other of said evaporator hot gas valves to cool the other of said conditioned spaces;
   (b) closing said condenser inlet valve to direct the flow of hot gaseous refrigerant through said open evaporator hot gas valves so that one of said evaporator coils heats its respective conditioned space;
   (c) continuously monitoring a head pressure of said refrigeration system, and
   (d) opening said condenser inlet valve whenever the system head pressure approaches a pressure associated with a circuit shut-down condition while continuously operating said compressor at said high speed.

12. The method defined in claim 11, further comprising the step of reclosing said condenser inlet valve when said system head pressure falls at least 150 psi.

13. The method defined in claim 12, further comprising the step of delaying the closing of said condenser inlet valve after the step of opening said evaporator hot gas valve for a time period of approximately five seconds.

14. The method defined in claim 11, wherein said system further includes a receiver tank for containing a reservoir of refrigerant, and a pressure valve for conducting hot, gaseous refrigerant from said compressor into said receiver tank to force pressurized liquid refrigerant into one of said evaporator coils in order to cool one of said conditioned spaces and further comprising the steps of opening said pressure valve when a system pressure falls below 300 psi and closing said pressure valve when said system pressure rises above 300 psi.

15. The method defined in claim 14, wherein said refrigeration system further includes a purge valve for recovering liquid refrigerant from said condenser coil, and further comprising the step of opening said purge valve when a head pressure of the system falls below about 200 psi, and closing said purge valve when said system pressure rises above about 300 psi.

16. A method for operating a multi-temp refrigeration system at a high compressor speed, wherein said system includes a compressor for compressing a refrigerant at a high speed and a low speed, a condenser coil for receiving and liquefying hot gaseous refrigerant, at least first and second evaporator coils for heating and cooling at least two different conditioned spaces, respectively, an evaporator hot gas valve for admitting hot gaseous refrigerant to one of said first or second evaporator coils to heat one or the other of said conditioned spaces, and a condenser inlet valve for admitting a flow of hot gaseous refrigerant to said condenser coil, comprising the steps of (a) opening said evaporator hot gas valve to admit hot gaseous refrigerant through one of said evaporator coils;

(b) closing said condenser inlet valve to direct a flow of hot gaseous refrigerant to said open evaporator hot gas valve, and (c) periodically opening and reclosing said condenser inlet valve to maintain a refrigerant head pressure in said system below a level associated with a system shut-down condition while continuously operating said compressor at said high speed.

17. The method defined in claim 16, wherein said system is operated at a low compressor speed prior to periodically opening and reclosing said condenser inlet valve.

18. The method defined in claim 16, wherein said system is continuously operated at a high compressor speed during all steps of said method.

* * * * *